United States Patent [19]

Farnsworth et al.

[11] Patent Number: 5,110,276

[45] Date of Patent: May 5, 1992

[54] EXTRUSION DIE ASSEMBLY

[76] Inventors: John T. Farnsworth, 1943 Stoneman St., Simi Valley, Calif. 93065; Roger D. Johnson, 16911 Shinedale Dr., Canyon Country, Calif. 91351; Gary W. Obrecht, 9625 Sylmar Ave., Apt. 43, Panorama City, Calif. 91412; Linda A. Young, 28025 N. Sarabande Ln., Apt. 1216, Canyon Country, Calif. 91351

[21] Appl. No.: 458,213

[22] Filed: Dec. 28, 1989

[51] Int. Cl.⁵ .................. B29C 47/12; B29C 47/30
[52] U.S. Cl. .................. 425/133.1; 264/176.1; 425/131.1; 425/382 R; 425/461; 425/463; 425/464
[58] Field of Search .......... 425/376.1, 382 R, 382.2; 264/176.1, 177.1, 177.16

[56]  References Cited

U.S. PATENT DOCUMENTS

| | | | |
|---|---|---|---|
| 2,952,873 | 9/1960 | Porter | 425/463 |
| 3,046,602 | 7/1962 | Houvener | 425/464 |
| 3,308,222 | 3/1967 | Kovacs | 264/177.16 |
| 3,367,100 | 2/1968 | Hughey | 425/382.2 |
| 3,840,318 | 10/1974 | Solop | 425/461 |
| 3,882,219 | 5/1975 | Wiley | 264/171 |
| 4,085,175 | 4/1978 | Keuchel | 425/382 R |
| 4,094,947 | 6/1978 | Alfrey et al. | 264/171 |
| 4,365,949 | 12/1982 | Nash | 425/463 |
| 4,397,628 | 8/1983 | Pinto et al. | 425/464 |
| 4,403,934 | 9/1983 | Rasmussen | 425/192 R |
| 4,540,537 | 9/1985 | Kamp | 264/171 |
| 4,772,197 | 9/1988 | Heck | 425/382 R |

FOREIGN PATENT DOCUMENTS 62-256627 11/1987 Japan .
63-13730 1/1988 Japan .

Primary Examiner—Jay H. Woo
Assistant Examiner—James P. Mackey

[57] ABSTRACT

A free-standing die assembly, for use in the production of extruded products, which is mounted as a separate unit apart from the extruder in which product ingredients are processed. The die assembly includes a center plate having a die unit secured to one or more planar faces of the plate, with each of the die units having at least one die orifice in the outer surface thereof. Hot flowable dough processed in an extruder is carried via suitable tubing to the center plate from where it is distributed to the planar faces of the plate and into the die units, from which it is extruded through the die orifices in the die units. The die assembly may be modified to permit the production of coextruded product from the die orifices in the die units of the assembly. One or more of the die assemblies may be associated with a single extruder. In accordance with a preferred embodiment, die units are secured to opposing side faces of the center plate to provide a free standing, dual-faced die assembly.

8 Claims, 6 Drawing Sheets

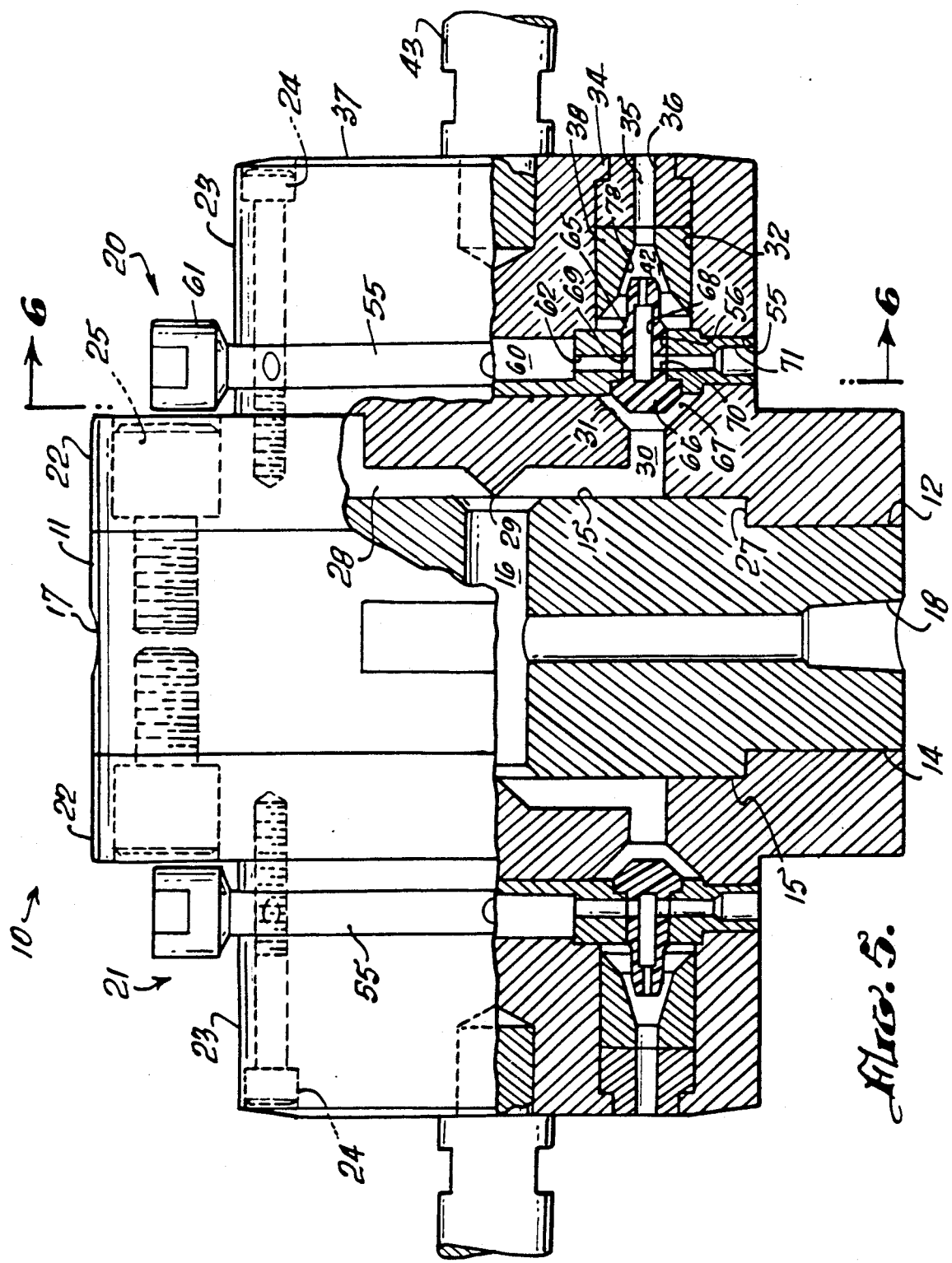

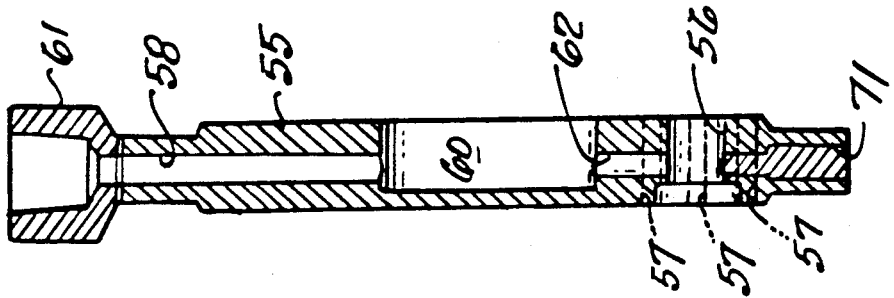
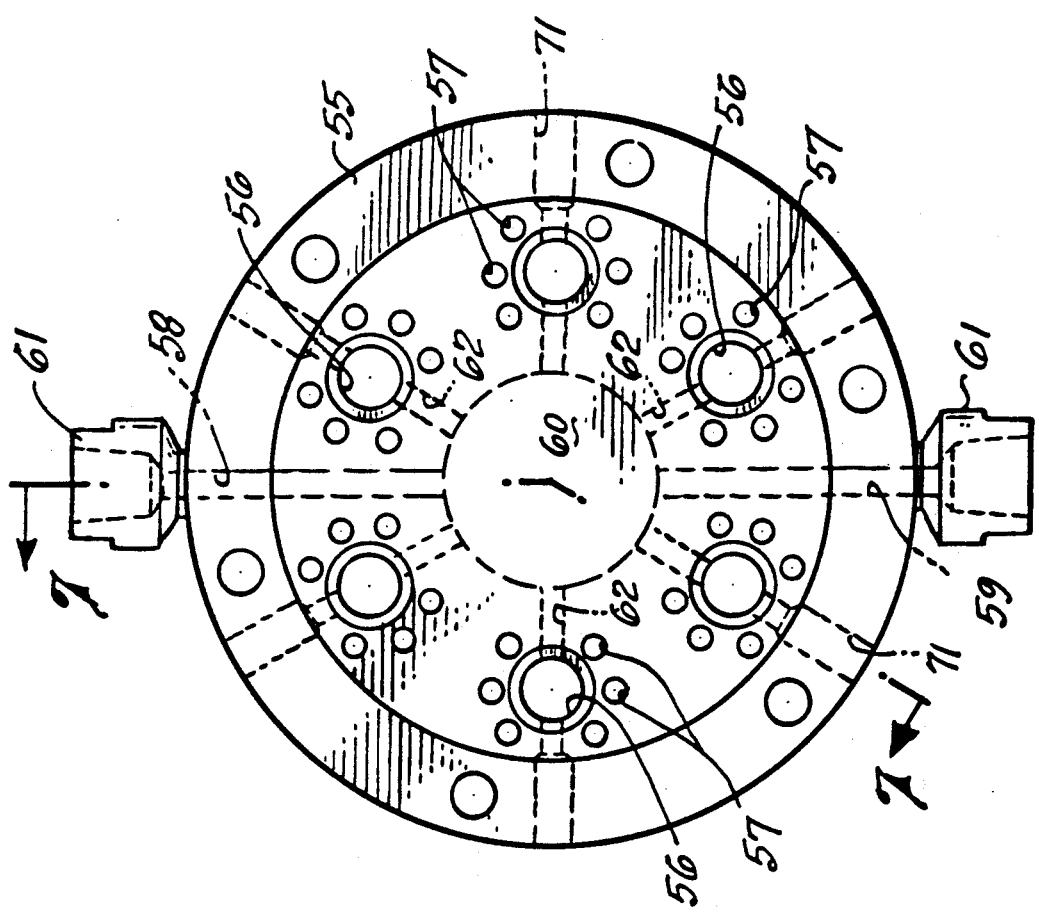

EXTRUSION DIE ASSEMBLY

BACKGROUND OF THE INVENTION

This invention relates to an extrusion die assembly and to a system for producing extruded products utilizing the die assembly. More particularly, the invention a free-standing, die assembly suitable for use in the production of extruded products, particularly food products with the die assembly being detached from the extruder.

Extruders, of both the single screw and twin-screw types, are widely used in a number of industries, especially the food industry in which extruders are utilized to produce a variety of products such as snack foods, breakfast cereals, pet foods, texturized vegetable proteins, and confections. Typical extruders consist of one or more sets of flighted screws which rotate within a barrel. Suitable ingredients are introduced into the inlet end of the extruder, with the ingredients being cooked and formed into a flowable dough during passage through the extruder by dissipation of mechanical energy through shearing action, and/or heat transfer through jackets surrounding the barrel and/or by steam injection into the barrel. The flowable dough thus formed is forced through one or more die openings of uniform size and shape in a die plate mounted across the discharge end of the extruder, and the extrudate is cut into pieces of a desired length and dried.

Extrusion dies currently used in the production of extruded foods give rise to a number of disadvantages in commercial production operations. For example, since the die plate is mounted on the extruder head, the number of die openings in the die plate is limited by the diameter of the extruder head, thereby limiting the production capacity of the extruder. Moreover, the production of extruded pieces having different shapes requires the use of separate die plates, each having die orifices of one desired cross-sectional configuration, so that the operation of the extruder must be interrupted to effect such a change. If a single extruder is used, a predetermined quantity of extruded pieces having one shape/size is produced, after which, operation of the extruder is interrupted while the die plate is replaced with another having die orifices of a different shape/size. Such interruptions in the operation of the extruder has an adverse effect on the production capacity of the extruder.

In the production of coextruded foods, that is, products having an outer shell, such as an expanded, cellular farinaceous and/or proteinaceous material, surrounding a central core of material which is dissimilar in some respect (e.g. texture, composition, consistency, color, flavor, etc.) from the shell material, the shell and core materials typically are processed in separate extruders. The separate materials are then extruded through concentric dies in a die plate mounted across the discharge end of one of the extruders, generally the extruder in which the shell ingredients are processed. Typically the two extruders are positioned perpendicular to one another, with the discharge ends of the extruders abutting one another. This arrangement of the extruders and the concentric dies in the production of coextruded products is disadvantageous in a number of respects. For example, positioning the extruders so that the discharge ends abut one another restricts the placement options for the extruders. Moreover, the number of concentric dies in the die plate is limited by the diameter of the extruder head, thereby limiting production capacity of the coextrusion operation.

SUMMARY OF THE INVENTION

The present invention provides a free-standing extrusion die assembly for use in the production of extruded products particularly food products, including coextruded, coexpanded and centerifilled products, which is mounted apart from the extruder in which ingredients are processed rather than on the discharge end of the extruder. That is, the die assembly of this invention is mounted as a separate unit on a suitable support detached from the extruder, with the die assembly being connected to the discharge end of an extruder by suitable tubing or piping. One or more of the extrusion die assemblies may be connected to a single extruder.

The free-standing die assembly of this invention includes a center plate having a axial central channel therein into which hot flowable dough is pumped, via suitable tubing, such as flexible metal tubing, from the discharge end of an extruder. The center plate has one or more die plates secured to the outer surface thereof in communication with the central channel. Each of the die plates mounted on the block has one or more shaped die orifices therein through which the dough is extruded. The size of the die plates and the number of orifices therein is independent of the head diameter of the extruder with which the die assembly is associated. Suitable cutting means, such as a rotary knife, mounted adjacent the outer face of each die plate, cuts the extrudate to a desired length. When two or more die plates are mounted on the block, the number, size and shape of the die orifices in the plates may vary.

The free standing die assembly of this invention effectively increases the production capacity of a given extruder and provides increased flexibility in the production of extruded, coextruded, coexpanded, and/or centerfilled product That is, since the die assembly is detached from the extruder, the number of die openings is no longer limited by the diameter of the extruder head. For example, the present invention permits the use of multiple die assemblies fed by a single extruder, thereby increasing the production capacity of the extruder. Alternatively, a single die assembly having two or more die plates mounted on the assembly may be used, again increasing the number of die orifices associated with a single extruder. Moreover, the die assembly of this invention permits the production of extruded product having multiple shapes, sizes and/or colors from one or more extruders without interrupting the operation of the extruders.

The die assembly of this invention may, if desired, be used in the production of coextruded, coexpanded or centerfilled products. That is, the die assembly may be modified to include a coextrusion die member in each of the die orifices, with the shell component material being pumped from one extruder into the distribution ring of the die assembly, and the core component material being pumped to the coextrusion die member mounted in the die orifice. If used in this manner, the free-standing die assembly of the present invention not only results in increased production capacity and flexibility, but also affords machine placement options not heretofore available in a coextrusion operation.

BRIEF DESCRIPTION OF THE DRAWINGS

FIG. 2 is a view, partly in section, along line 2—2 of FIG. 1;

FIG. 5 is a side view, partly in section, of the free standing dual-faced die assembly which includes a coextrusion die unit;

FIG. 6 is an axial sectional view taken on line 6—6 of FIG. 5;

FIG. 7 is a sectional view taken along line 7—7 of FIG. 6;

DETAILED DESCRIPTION OF THE INVENTION

Figure 1:
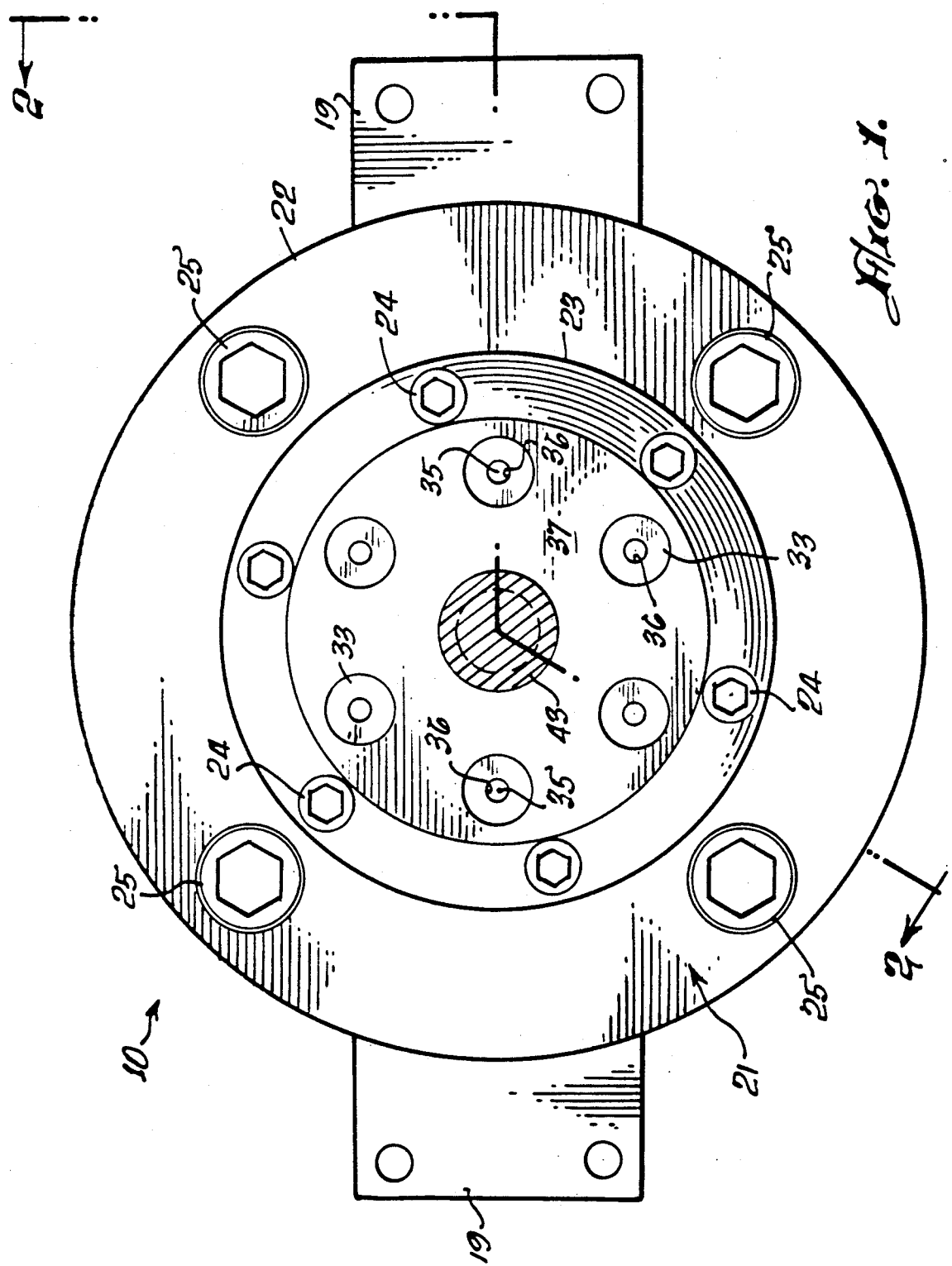
FIG. 1 is an end elevational view of a free standing, extrusion die assembly of the present invention with the die assembly having two die plates.

The free-standing die assembly of this invention will be described and illustrated with particular reference to a die assembly having a pair of die plates through which product is extruded. It will be understood, however, that the present invention is not limited to such a dual-faced die assembly but also includes free standing die assemblies having a single or multiple die plates. As illustrated in FIGS. 1 and 2, the die assembly, generally designated by reference numeral 10, includes a center plate 11, generally in the form of a flat circular plate having a pair of planar side faces 12 and 14, with side faces 12 and 14 having a circular boss 15 extending therefrom. Center plate 11 is provided with an axial central channel 16 extending between the planar side faces of the plate. One or more inlet passages, such as opposed inlet passages 17 and 18 extend through the center plate from the outer surface thereof to central channel 16. The inlet passages are in direct communication with feed conduits (not shown) which transport hot flowable dough from an extruder to die assembly 10, with the dough passing through the inlet passages into channel 16. Support brackets 19 are affixed to opposing edges of center plate 11 for securing the die assembly 10 to a suitable support (not shown) apart from the extruder.

As shown in FIG. 2, die units 20 and 21 are secured to planar side faces 12 and 14 respectively of center plate 11. Die units 20 and 21 preferably include a pair of circular or disc-shaped plates, namely, distribution plate 22 and die plate 23, secured together in face-to-face relationship by circumferentially spaced bolts 24, with die units 20 and 21 being secured against side faces 12 and 14 of center plate 11 by circumferentially spaced axial bolts 25. Die units 20 and 21 are substantially identical in construction, being mirror images of one another. Accordingly, only the construction of one of the die unit (20) will be described in more detail hereinbelow, it being understood that the construction of the other die unit (21) is identical to that of the unit described.

Distribution plate 22, which abuts center plate 11, has an annular ridge 27 around the circumference thereof which is engaged by circular boss 15 of center plate 11 to facilitate proper alignment of the distribution plate on the center plate. Distribution plate 22 includes a generally circular distribution chamber 28 having a conical distribution point 29 milled into the upstream face thereof. When distribution plate 22 is mounted against the center plate, chamber 28 is disposed about axial central channel 16 with the apex of point 29 being adjacent the center of distribution channel 16 to facilitate the uniform distribution of flowable dough throughout chamber 28. A plurality of axial feed passages 30 spaced equidistant about the periphery of chamber 28 traverse distribution plate 22 from distribution chamber 28 to the downstream face of plate 22, with each of axial feed passages 30 terminating in a frustroconical chamber 31 at the downstream face of plate 22.

Secured to the downstream face of distribution plate 22 is die plate 23, which includes a plurality of circumferentially spaced axial conduits 32 extending therethrough to the outer face 37 of the die plate, with a conduit 32 being opposed to and axially aligned with each feed passage 30 in distribution plate 22. Mounted within each conduit 32 is a die insert member 33 retained in position in plate 23 by flange portion 34 and having a cylindrical passage 35 extending axially therethrough, terminating in shaped die orifice 36 in the outer face 37 of die plate 23. Die orifice 36 may have any desired cross-sectional shape and/or size, depending on the shape and/or size of the extruded product desired. That is, orifices 36 may be circular, square, triangular, or other suitable shape. The die orifices in one of the die units (e.g. 20) may have a cross-sectional shape and/or size which is the same as or different than the die orifices in the other die unit (e.g. 21). Die plate 32 may be modified, if desired, whereby die inserts are not utilized. In this embodiment, conduits 32 do not extend through to the outer face 37 of the die plate. Rather, openings of a desired size are drilled through the outer face of the die plate to provide die orifices 36, with the openings being in communication with conduits 32.

In accordance with another embodiment of the invention, die units 20 and 21 may each comprise a single plate (e.g. die plate 23) rather than a pair of plates joined together. In this embodiment, the distribution chamber 28 may be milled or otherwise formed into the upstream face of the die plate with axial feed passages 30 extending to the outer face 37 of the die plate.

Rotatable shaft 43 journaled in conventional support bearing structure on the outer face 37 of die plate 23, carries one or more conventional rotary knife (not shown) for cutting material extruded from die orifice 36 into predetermined lengths. Other suitable cutting means may, of course, be used.

If desired, the die assembly illustrated in FIG. 2 may be modified to provide a die assembly having a single or multiple die plates through which product is extruded. To provide a die assembly having a single die plate, one of the die units (e.g. 21) is removed from center plate 11 and is replaced with an imperforate plate. To provide a free-standing die assembly having more than 2 die plates, center plate 11 is replaced with a polygonal distribution block having 3 or more planar faces (e.g. triangular, square, rectangular, etc.) and a die unit (e.g. 20) is mounted on the desired number of planar faces of the block. A central channel, which is in communication with a feed conduit from an extruder, extends from the interior of the block to each of the die units to carry dough pumped from an extruder to the distribution chamber 28 of each die unit.

Figure 3:
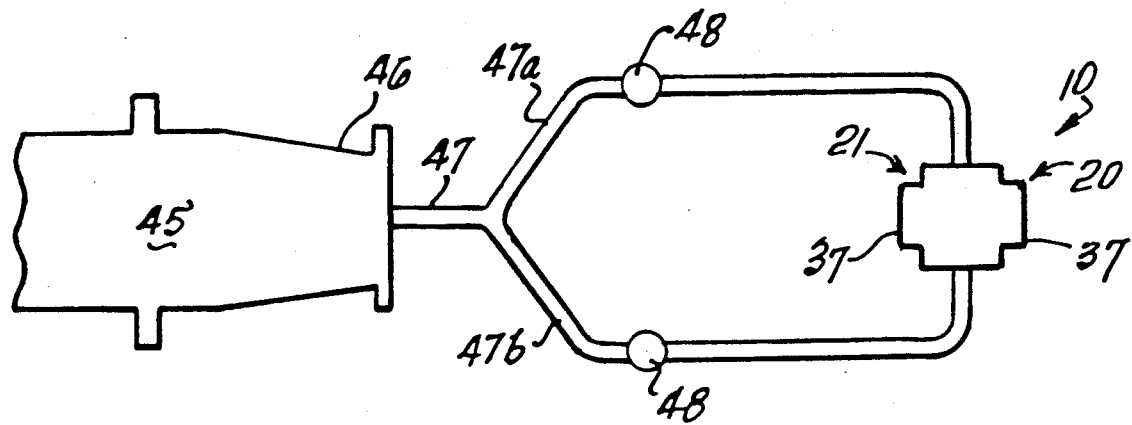
FIG. 3 is a schematic representation, not to scale, of a system for the production of an extruded food product using the free-standing, dual-faced die assembly of FIGS. 1 and 2.
Figure 4:
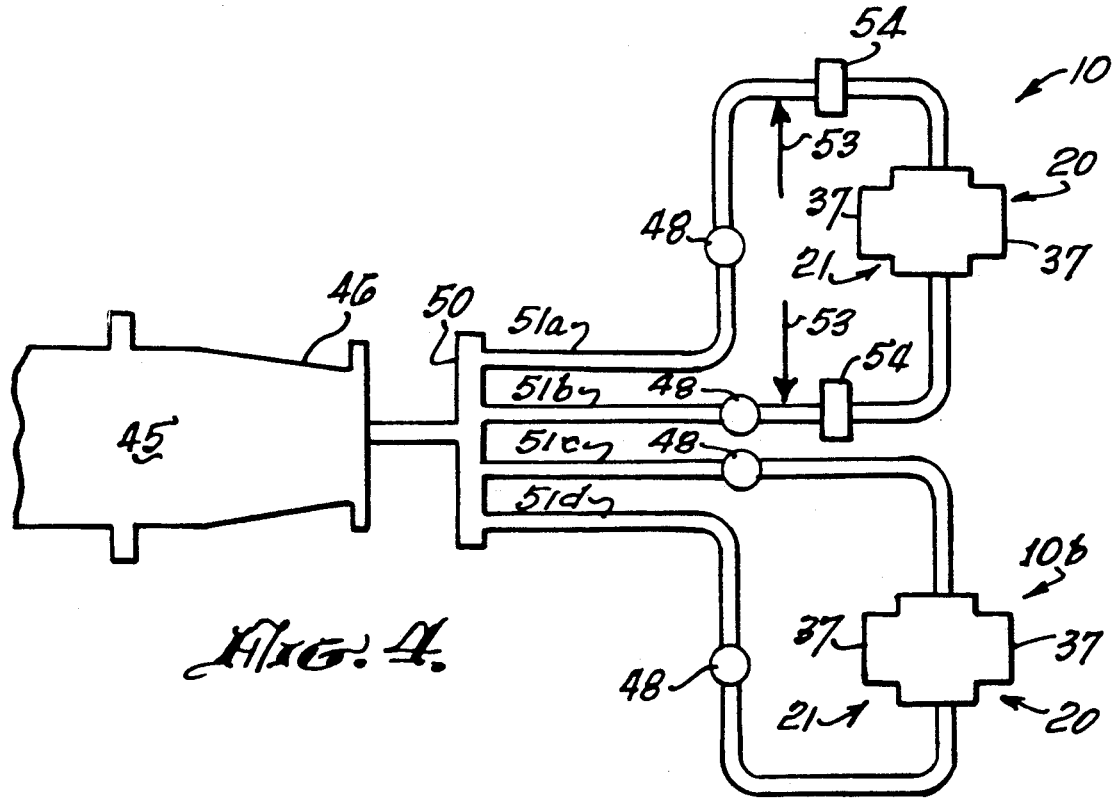

FIG. 3 illustrates one embodiment of a system for the production of an extruded food product incorporating the free-standing, dual-faced die assembly described in connection with FIGS. 1 and 2. As shown in FIG. 3, the die assembly 10, which has a pair of die units 20, 21, is mounted as a separate unit apart from the extruder 45 in which the ingredients for the product are processed. Any conventional extruder, either of the single screw or twin-screw type, used in the food industry, such as commercially available Wenger, Clextral or other extruder may be used. In the extruder, a mixture of moistened farinaceous and/or proteinaceous materials is subject to mechanical working under elevated heat and pressure to cook the ingredients into a hot flowable dough. The dough thus formed is extruded from the discharge end 46 of the extruder into conduits 47, 47a and 47b, such as flexible metal tubing, which carry the dough to die assembly 10. Flow control means 48, such as suitable valves, pumps or other similar devices, are provided in conduits 47a and 47b to adjust the rate of feed of dough to the die assembly. If desired, dough from the extruder may be carried to the die assembly in a single line (e.g. 47) rather than through two lines as illustrated in FIG. 3.

Hot flowable dough carried to die assembly 10 is introduced into inlet passages 17 and 18 in center plate 11 (FIG. 2), and into central channel 16 which carries the dough to the opposing side faces 12 and 14 of the center plate and into the die units 20 and 21. The dough enters distribution chamber 28 in both die units, in which the dough is uniformly distributed by conical point 29, and is carried through distribution channel 30, axial conduits 32, and passage 35, and is extruded through one or more shaped die orifices 36 circumferentially spaced about the outer face 37 of die units 20 and 21. Material extruded from both die units is cut to desired length by a conventional rotary knife (now shown) mounted adjacent the die orifices. The number, size and/or shape of the die orifices in one die unit may be the same as or different than the die orifices in the other die unit. If different, it can be appreciated that the free standing die assembly of this invention permits the simultaneous production of extruded pieces having different sizes or shapes.

Figure 4:
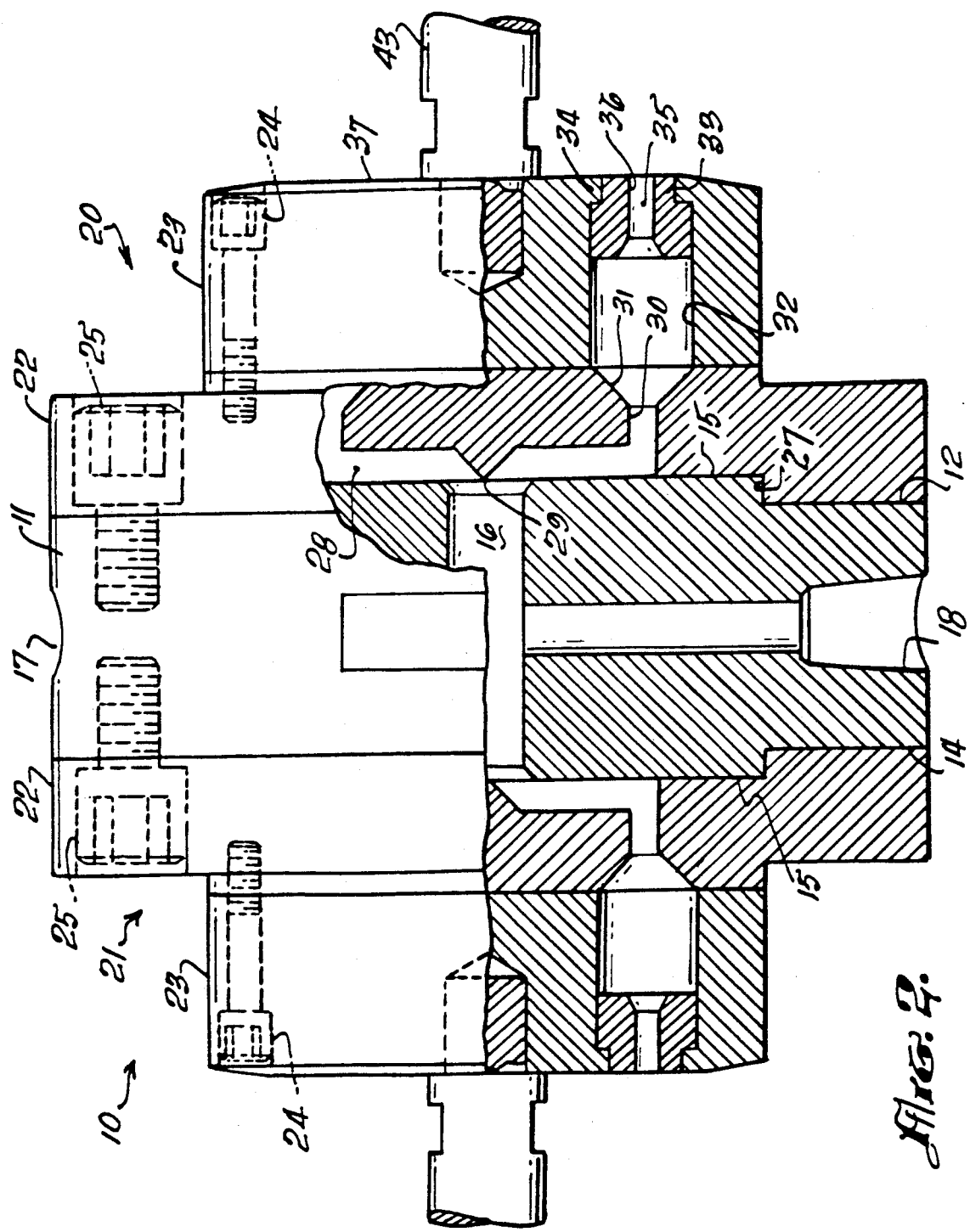
FIG. 4 is a schematic representation, not to scale, of another embodiment of a system in which a plurality of the free standing dual-faced die assemblies of this invention are used in conjunction with a single extruder.

FIG. 4 illustrates another embodiment of the invention in which the extrudate from a conventional extruder 45 is fed to a pair of free-standing, dual-faced die assemblies as described in FIGS. 1 and 2. In this embodiment, hot flowable dough is pumped from the discharge end 46 of extruder 45 into feed manifold 50, from which it passes into conduits 51a and 51b, which carry the dough to die assembly 10a, and conduits 51c and 51d, which carry the dough to die assembly 10b. If desired, an additive, such as coloring, flavoring, etc. may be injected into the conduits carrying the hot flowable dough to one or both of the die assemblies. Thus, an additive is pumped from a supply tank (not shown) through lines 53 and injected into conduits 51a and 51b, which carry the dough to die assembly 10a, under sufficient pressure to deposit the additive in the flowable dough in the conduits. A suitable mixing device 54, such as a static mixer, is provided in conduits 51a and 51b to mix the additive substantially uniformly throughout the dough in the conduits. Similarly, an additive may, if desired, also be injected into conduits 51c and 51d, which carry the dough to die assembly 10b. This additive may be the same as or different than the additive injected into conduits 51a and 51b. If the additives, such as coloring, are different, it can be appreciated that the embodiment illustrated in FIG. 4 permits the production of product pieces having different colors, shapes, sizes, density, and textures using a single extruder, without interruption in the operation of the extruder. Dough pumped to die assemblies 10a and 10b is extruded from orifices in both outer faces 37 of both die assemblies as described above.

As noted hereinabove, the die assembly of this invention may be modified, if desired, to permit the production of coextruded, coexpanded or centerfilled products. In this embodiment, which is shown in FIGS. 5-7, the die assembly of FIG. 1 is modified by including a coextrusion plate 55 in both die units 20 and 21, with the coextrusion plate being mounted between distribution plate 22 and die plate 23 on both sides of center plate 11. Coextrusion plate 55 includes a plurality of circumferentially spaced conduits 56 extending axially through the plate, with each of conduits 56 being opposed to and axially aligned with a feed passage 30 in distribution plate 22. A number of equalizer ports 57 are provided parallel to and circumferentially disposed about each of conduits 56, with the equalizer ports extending through plate 55 in direct communication with frustroconical chamber 31. Also included in coextrusion plate 55 are one or more feed passages, such as opposed longitudinal feed passages 58 and 59, extending through plate 55 and terminating in reservoir chamber 60 milled into the downstream face of plate 55. Feed passages 58 and 59 are in direct communication with feed conduits (not shown) through connectors 61 for the transport of the core or filling material of the product to the die assembly. A plurality of passages 62 extend radially outwardly from reservoir chamber 60, with a passage 62 extending to each of the axial conduits 56.

A die member 65 having a frustroconical nose 66 is mounted concentrically within each of conduits 56, with frustroconical nose 66 being positioned in but spaced from the walls of chamber 31 to define an extrusion passageway 67. Die member 65 includes a longitudinal passage 68 and has a pair of opposed openings 69 and 70 through the walls of the die member whereby longitudinal passage 68 is in direct communication with reservoir chamber 60 and passage 62 through opening 69. A cylindrical opening 71 extends from each axial conduit 6 to the outer surface of plate 55, and a pin (not shown) is mounted in each opening 71 to secure the die member 65 in position.

A second die insert member 38, mounted in axial conduit 32 upstream of first die insert member 33, has a central extrusion passage 42 along the longitudinal axis thereof, with passage 42 having three contiguous sections, namely, an inwardly tapering upstream section, a cylindrical downstream section, and an inwardly tapering intermediate section. As shown in FIG. 5, the downstream end of die member 65 is spaced from the inwardly tapering walls of the intermediate section of second die insert 38 to define an annular extrusion passage 73 between the outer surface of die member 65 and extrusion passage 42.

The production of a composite coextruded, coexpanded or centerfilled product utilizing the die assembly shown in FIG. 5 proceeds as follows. The hot, flowable dough for the shell component of the product is pumped from an extruder via suitable tubing to inlet passages 17 and 18 in center plate 11, and into the central channel 16. As described above in connection with FIG. 3, the dough passes into chamber 28, axial feed passages 30 and frustroconical chambers 31 in both die units 20 and 21. From chamber 31, the flowable dough passes through equalizer ports 57 in coextrusion plate 55 to extrusion passage 73 around the downstream end of die member 65, and is extruded through die orifice 36 in the form of a tubular shell. Feed equalizer ports 57 are sized sufficiently small to create a back pressure or pressure differential thereacross sufficient to ensure complete distribution of flowable dough throughout distribution chamber 28.

The core or center material for the coextruded product is pumped from a suitable source via tubing to feed passages 58 and 59 in coextrusion plates 55 mounted in each die unit. The dough is carried to reservoir chamber 60 from which it passes into each of the radially extending passages 62 and into the longitudinal passage 68 to each of the die members 65 circumferentially spaced about reservoir chamber 60. The flowable core material is extruded from die members 65 through passages 42 and 35, and is discharged from die orifices 36 as a concentric filling material within the tubular shell component.

Figure 8:
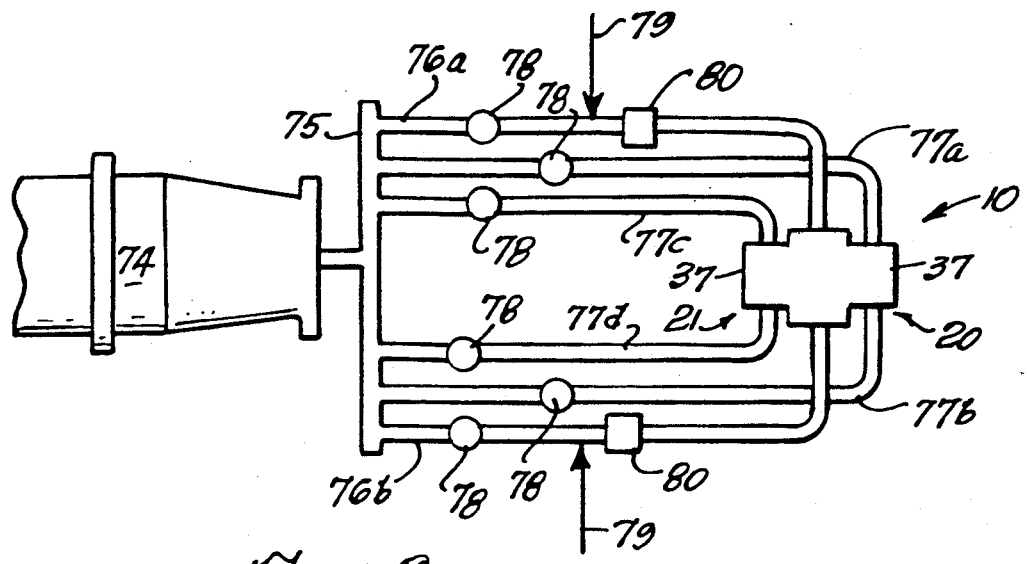
FIG. 8 is a schematic representation, not to scale, of a system for the production of a coextruded product using the die assembly of FIG. 5.

FIG. 8 illustrates one embodiment of a system in which the free-standing dual-faced die of FIGS. 5-7 is used in the production of a coextruded food product. In this embodiment, a single extruder is used to supply both the shell component and the core component of the product. As shown in FIG. 8, the die assembly 10, which contains a coextrusion plate in the die units 20 and 21 on both sides of the center plate, is mounted as a separate unit, apart from the extruder 74 in which suitable ingredients are heated and cooked to form a hot flowable dough. The dough is extruded under pressure into feed manifold 75.

Dough for the shell component of the product is carried in lines 76a and 76b to inlet passages 17 and 18 in the center plate 11 of die assembly 10. Dough for the core component of the product is carried in lines 77a, 77b, 77c and 77d to feed passages 58 and 59 in the coextrusion plates on each side of the center plate. Flow control means 78 such as a suitable valve, pump, and the like is provided in each of the lines from the manifold 75 to the die assembly 10 to adjust the rate of dough feed to the die assembly. In order to distinguish the shell material from the core material of the coextruded product, an additive, such as coloring, flavoring, etc. is injected through lines 79 into the dough carried in lines 76a and 76b, and the dough is carried through a suitable in-line mixer 80 in lines 76a and 76b to mix the additive substantially uniformly throughout the dough. The passage of the dough for the shell component and the dough for the core component through the die assembly proceeds as described hereinabove in connection with FIGS. 5-7, with coextended product being discharged from die orifices in both outer faces 37 of both die units 20 and 21.

Figure 9:
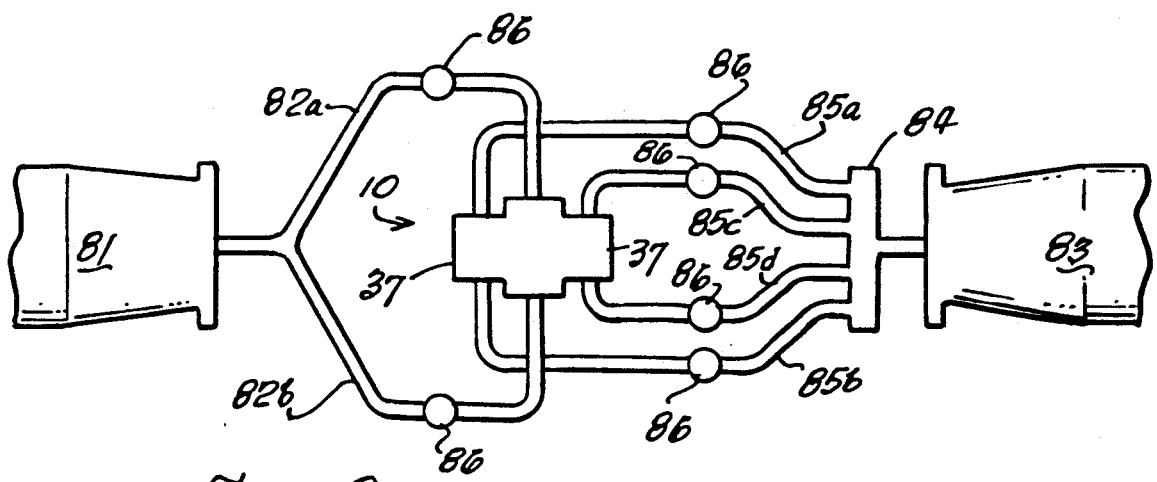
FIG. 9 is a schematic representation, not to scale, of another embodiment of a system for producing a coextruded product using the free standing, dual-faced die assembly.

FIG. 9 illustrates another embodiment of a system for the production of a composite coextruded product in which hot flowable dough from two extruders is fed to a free-standing, dual faced die assembly. Dough for the shell component of the product is discharged from extruder 81 and is carried in lines 82a and 82b to inlet passages 17 and 18 of the center plate 11 of die assembly 10. Dough for the core component is discharged from extruder 83 into feed manifold 84 and is carried in lines 85a, 85b, 85c and 85d to feed passages 58 and 59 in the coextrusion plates on both sides of the center plate of die assembly 10. Suitable flow control means 86 is provided in each of the lines from both extruders to the die assembly. The passage of dough for the shell component and the core component of the product proceeds as described above in connection with FIGS. 5-7, with coextruded product being extruded from die orifices on both sides of the die assembly, with coextruded product being discharged from die orifices in both outer faces 37 of the two die units.

If desired, an additive, such as coloring, flavoring, etc. may be injected into the lines carrying the core component dough to either or both coextrusion plates and/or to the center distribution block. This flexibility enables a variety of coextruded products to be produced using a single die assembly, without interrupting the operations of the extruders.

The free-standing die assembly of this invention may be used with any conventional extruders in connection with the production of extruded, coextruded, coexpanded or centerfilled food products. No change in the operating characteristics or screw configuration of conventional extruders having a die plate affixed to the extruder is required when the free standing die assembly of this invention is used. Similarly, the same ingredient mix used for the production of extruded, coextruded, coexpanded or centerfilled products with a conventional die plate attached to an extruder may be used in the production of product using the die assembly of this invention. The die assembly may be used in connection with the production of any product which is produced on conventional extruders, and is particularly well suited for use in the production of food products, such as pet foods, breakfast cereals, snack foods, confections, savory coatings, bread crumbs, croutons, and the like.

What is claimed is:

1. A free-standing extrusion die assembly in communication with but mounted apart from the discharge end of an extruder, said die assembly comprising
   a flat center plate having a pair of opposed planar side faces, channel means extending between said planar side faces for carrying extrudate material to said opposed planar side faces, and at least one inlet passage communicating with said channel means and extending perpendicular to said channel means for introducing extrudate material from an extruder into said channel means, and
   a pair of die units, with one of said die units being mounted on each of the planar side faces of the center plate, each of said die units having at least one axial conduit means extending therethrough for carrying extrudate material, with each of said conduit means being in communication with the channel means of said center plate and forming a shaped die orifice in a downstream face of each die unit.

2. The die assembly defined in claim 1 in which each of the die units has a plurality of said axial conduit means extending therethrough to form a plurality of die orifices spaced substantially equidistant in the downstream face of each die unit.

3. The die assembly defined in claim 2 in which each of the die units includes a distribution chamber adjacent the center late, in communication with the channel means of said center plate, said distribution chamber having a plurality of openings spaced substantially equidistant around the periphery thereof wherein one of said axial conduit means is in communication with each of said openings.

4. A free-standing extrusion die assembly in communication with but mounted apart from the discharge end of an extruder, said die assembly comprising a flat center plate having a pair of opposed planar side faces, channel means extending between said planar side faces for carrying extrudate material to said opposed planar side faces, and at least one inlet passage communicating with said channel means and extending perpendicular to said channel means for introducing extrudate material from an extruder into said channel means, and a pair of die units, with one of said die units being mounted on each of the planar side faces of the center plate, with each of said die units comprising a distribution plate having an upstream face which is mounted on said planar side face of the center plate and a downstream face, and a die plate mounted on a downstream face of each die plate, each of said distribution plates having a distribution chamber in the upstream face thereof for receiving extrudate material from said channel means, and a plurality of axial passages substantially equidistant around said distribution chamber extending through the distribution plate to the downstream face thereof for carrying extrudate material, each of said die plates having a plurality of axial conduits extending therethrough for carrying extrudate material, with each of said axial conduits being in communication with each of the axial passages in the distribution plate and forming a shaped die orifice in a downstream face of each die plate.

5. The die assembly defined in claim 4 in which each of the die orifices in one of said die units has a cross-sectional configuration different than that of each of the die orifices in the other die unit.

6. The die assembly defined in claim 4 in which each of said die units further includes a coextrusion plate mounted between said distribution plate and said die plate. said coextrusion plate having a plurality of openings extending therethrough substantially equidistant around the coextrusion plate. wherein one of said plurality of openings is axially aligned and in communication with each of said plurality of axial conduits in said die plate, a reservoir chamber for receiving filling material, an inlet port for introduction of filling material into the reservoir chamber, a coextrusion die member mounted within each of the openings in said coextrusion plate and extending into an associated axial conduit of the die plate to form an annulus between each coextrusion die member and the associated axial conduit, with each of said coextrusion die members having a longitudinal passage therein, means for carrying extrudate material from the axial passages of a distribution plate around said plurality of coextrusion die members through the annuli, and means for carrying filling material from the reservoir chamber to the longitudinal passage in each coextrusion die member for discharge from each of the die members, wherein the coextrusion die members and axial conduits are configured so that the extrudate material carried through said annuli flows coaxial with and around the filling material discharged from the coextrusion die members.

7. The die assembly defined in claim 6 in which the coextrusion plate includes a plurality of radially extending passages wherein one of said plurality of radially extending passages extends between said reservoir chamber and each of said openings in the coextrusion plate for carrying filling material from the reservoir chamber to each of the coextrusion die members.

8. The die assembly defined in claim 6 in which said means for carrying extrudate material comprises a plurality of equalizer ports extending through said coextrusion plate adjacent each of the openings in said coextrusion plate.

* * * * *